US008817178B2

(12) United States Patent
Baker

(10) Patent No.: US 8,817,178 B2
(45) Date of Patent: Aug. 26, 2014

(54) CAMERA MOUNT ADAPTER FOR MULTIPLE DEVICES

(76) Inventor: Gary Wayne Baker, Belen, NM (US)

( * ) Notice: Subject to any disclaimer, the term of this patent is extended or adjusted under 35 U.S.C. 154(b) by 144 days.

(21) Appl. No.: 13/607,747

(22) Filed: Sep. 9, 2012

(65) Prior Publication Data

US 2014/0071339 A1 Mar. 13, 2014

(51) Int. Cl.
*H04N 5/225* (2006.01)
(52) U.S. Cl.
USPC .......................... 348/375; 396/428; 248/187.1
(58) Field of Classification Search
USPC ............. 348/207.99, 373–376; 396/419–428, 396/544; 248/177.1–187.1, 370; 359/375–378, 401, 404, 407–418, 480; D16/133, 239, 244, 245; 352/243; 294/139; 224/908; 211/203; 312/7.2, 312/223.1–223.6; 206/316.1–316.3
See application file for complete search history.

(56) References Cited

U.S. PATENT DOCUMENTS

| | | | |
|---|---|---|---|
| 2,599,269 A | 8/1949 | Markle | |
| 4,474,439 A | 10/1984 | Brown | |
| 4,727,390 A * | 2/1988 | Brown | 396/420 |
| 6,460,815 B1 * | 10/2002 | Thaler | 248/187.1 |
| 6,540,185 B2 * | 4/2003 | Ishikawa et al. | 248/187.1 |
| 8,057,112 B2 | 11/2011 | Amadril et al. | |
| 8,113,475 B2 | 2/2012 | Whittemore et al. | |
| 2005/0169625 A1 | 8/2005 | Smith | |
| 2005/0174433 A1 * | 8/2005 | Cirami | 348/207.99 |
| 2008/0156948 A1 * | 7/2008 | Cameron et al. | 248/187.1 |
| 2009/0268284 A1 * | 10/2009 | Yamamoto | 359/401 |
| 2011/0043910 A1 * | 2/2011 | Yamamoto | 359/480 |

OTHER PUBLICATIONS

"Scope Teknix iPhone holder for binoculars and telescopes", www.scopesnskies.com/prod/binocular/iphone-binocular-holder.html, dated to Nov. 30, 2010 via archive.org.*
"Scope Teknix combined laser finder bracket and binocular tripod mounting bracket", www.scopesnskies.com/prod/binocular/laser-finder/laser-tripod-bracket.html, dated to Oct. 17, 2006 via archive.org.*
"Scope Teknix solar finder and binocular mounting bracket for SolarZoom", www.scopesnskies.com/prod/binocular/solar-finder/solar-tripod-bracket2.html, dated to Oct. 17, 2006 via archive.org.*
"Scope Teknix combined red-dot finder and mounting bracket for binoculars", www.scopesnskies.com/prod/binocular/laser-finder/laser-tripod-bracket.html, dated to May 6, 2010 via archive.org.*
"Far-Sight stainless steel quick binocular mount", www.365astronomy.com/farsight-stainless-steel-quick-binocular-mount-for-finderscopes-p-2135.html, which states a date of Oct. 2, 2010.*

\* cited by examiner

*Primary Examiner* — Dennis Hogue

(57) ABSTRACT

The present invention provides a means for mounting a distance magnification device such as binoculars and a visual recording device such as a camera, simultaneously on a single recording device mount. The embodiment provides a means of configuring the distance magnification device and the visual recording device such that both may be trained on a common focal point. An example embodiment comprises a primary mounting means having a base and a substantially vertical, longitudinal member. A secondary vertical member is engaged with the primary mounting means and includes an interference means to engage the members along a longitudinal range of motion. The secondary vertical member includes a horizontal shaft including a knob at the proximal end and an engagement means at the distal end, providing engagement with a common fitting found on many binoculars. The secondary vertical member further comprises an engagement means for engaging with the visual recording device.

1 Claim, 8 Drawing Sheets

US 8,817,178 B2

CAMERA MOUNT ADAPTER FOR MULTIPLE DEVICES

BACKGROUND

Conventional photography equipment provides a standard threaded receptacle for engagement with a recording device mount on a tripod or similar stabilizing platform. It is often desirable to use a distance magnification device in combination with a recording device such as a camera or video camera. Long range photographers or videographers often use distance magnification devices such as binoculars to view the subject before engaging the recording device. Moving and adjusting between the two viewing devices involves considerable adjustment and alignment, particularly in keeping both pieces of equipment fixed on the same point.

One skilled in the art will understand that common fittings or engagement devices as found on mounting platforms of tripods and the like, can be altered to accommodate varying standards. The specific engagement means are intended to illustrate a preferred embodiment and are not intended to be limiting in any way. It is further understood by those skilled in the art that recording devices include still cameras, video cameras, including digital format devices and single lens reflex cameras and the like. For the purpose of convenience, the present embodiment is described in relation to binoculars and cameras. Such a description is solely for convenience and clarity and is not intended to be limiting in scope.

BRIEF DESCRIPTION

The present invention provides a means for mounting distance magnification devices such as binoculars and recording devices such as cameras, perpendicular to the recording device mount base; simultaneously, on a single recording device mount.

An example embodiment comprises a primary mounting means comprising a base and a substantially vertical member. A secondary vertical member is laterally engaged with the primary mounting means and includes an interference means to engage the members along the lateral range of motion. The secondary vertical member includes a horizontal shaft including a knob at the proximal end and an engagement means at the distal end. In a preferred embodiment a threaded portion provides engagement with a common fitting found for example on many binoculars. The secondary vertical member further comprises an engagement means for engaging with a recording device such as a camera or video camera.

It would be desirable to provide a structure that provides a means of mounting at least two visual devices on a recording device mount platform.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

DETAILED DESCRIPTION

Figure 1:
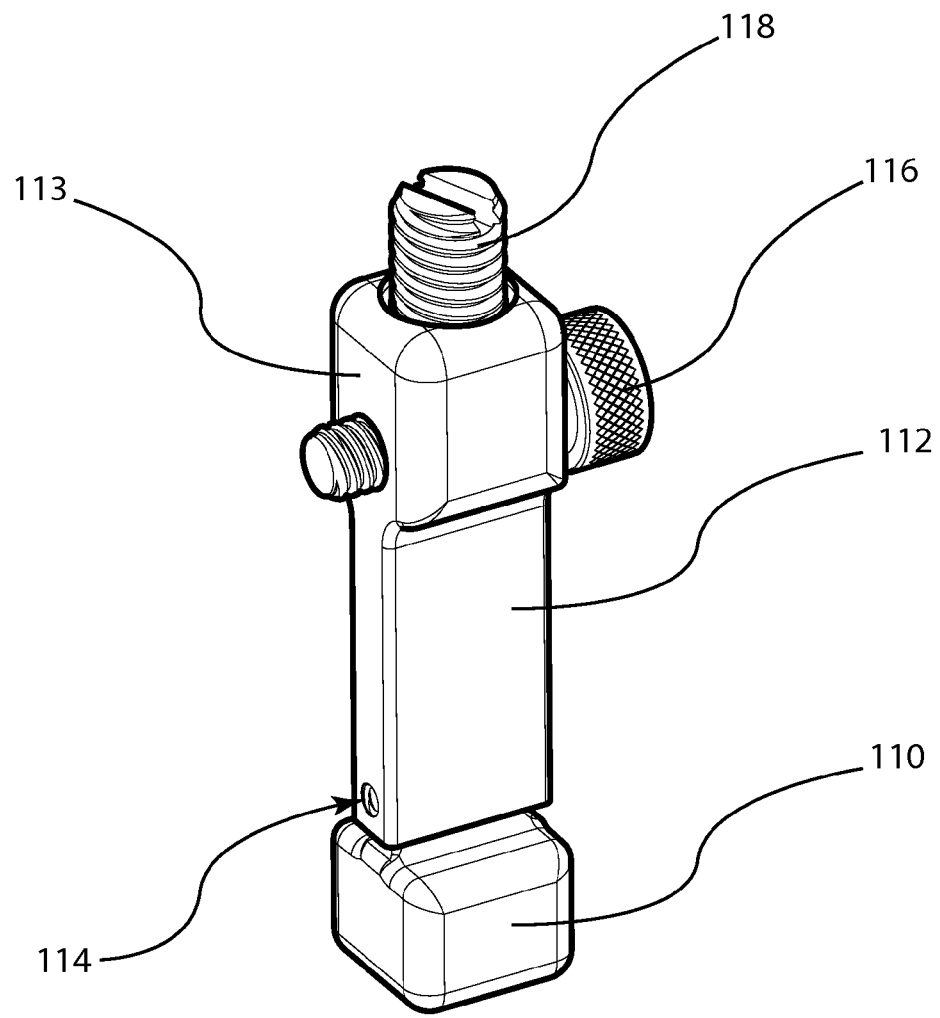
FIG. 1 is a front perspective view of an example embodiment of the present disclosure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the exemplary embodiments.

Although specific terms are used in the following description, these terms are intended to refer only to particular structures in the drawings and are not intended to limit the scope of the present disclosure. It is to be understood that like numeric designations refer to components of like function.

The term "about" when used with a quantity includes the stated value and also has the meaning dictated by the context. For example, it includes at least the degree of error associated with the measurement of the particular quantity. When used in the context of a range, the term "about" should also be considered as disclosing the range defined by the absolute values of the two endpoints. For example, the range "from about 2 to about 4" also discloses the range "from 2 to 4."

A threaded fitting employed to engage two members or to provide interference so as to prevent movement of components may be substituted by another longitudinal interference means though may be referred to as a threaded fitting for the purpose of brevity.

FIG. 1 is a perspective view of an exemplary embodiment of a brace 100 for mounting more than one visual apparatus to a recording device mount. The brace comprises a base portion 110 that is laterally engaged with an upper member 112. A hole in the upper portion is part of an interference means (further described in FIGS. 5 and 6). A threaded knob 116 is rotatably engaged with the upper top 113 of the upper member 112. A threaded fitting 118 is engaged with the top 113 of the upper member 112.

Figure 2:
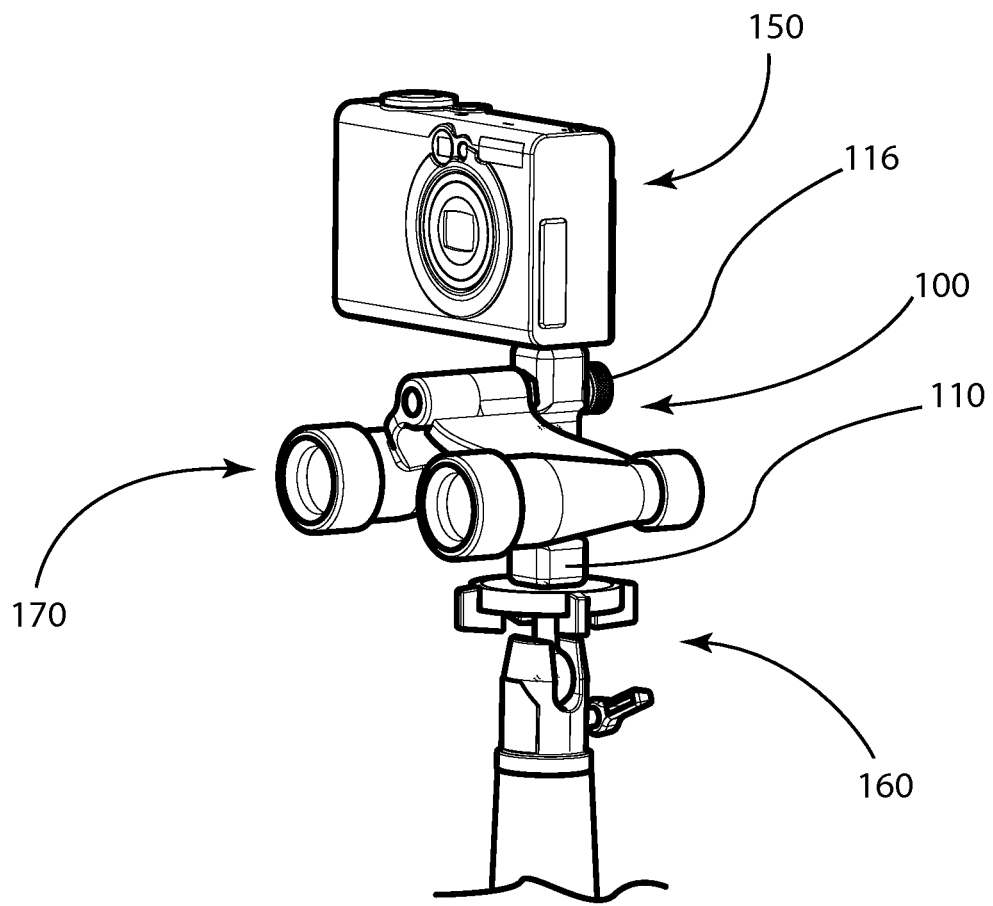
FIG. 2 is a front perspective view of an assembly including binoculars and a camera engaged with the embodiment of FIG. 1.
Figure 3:
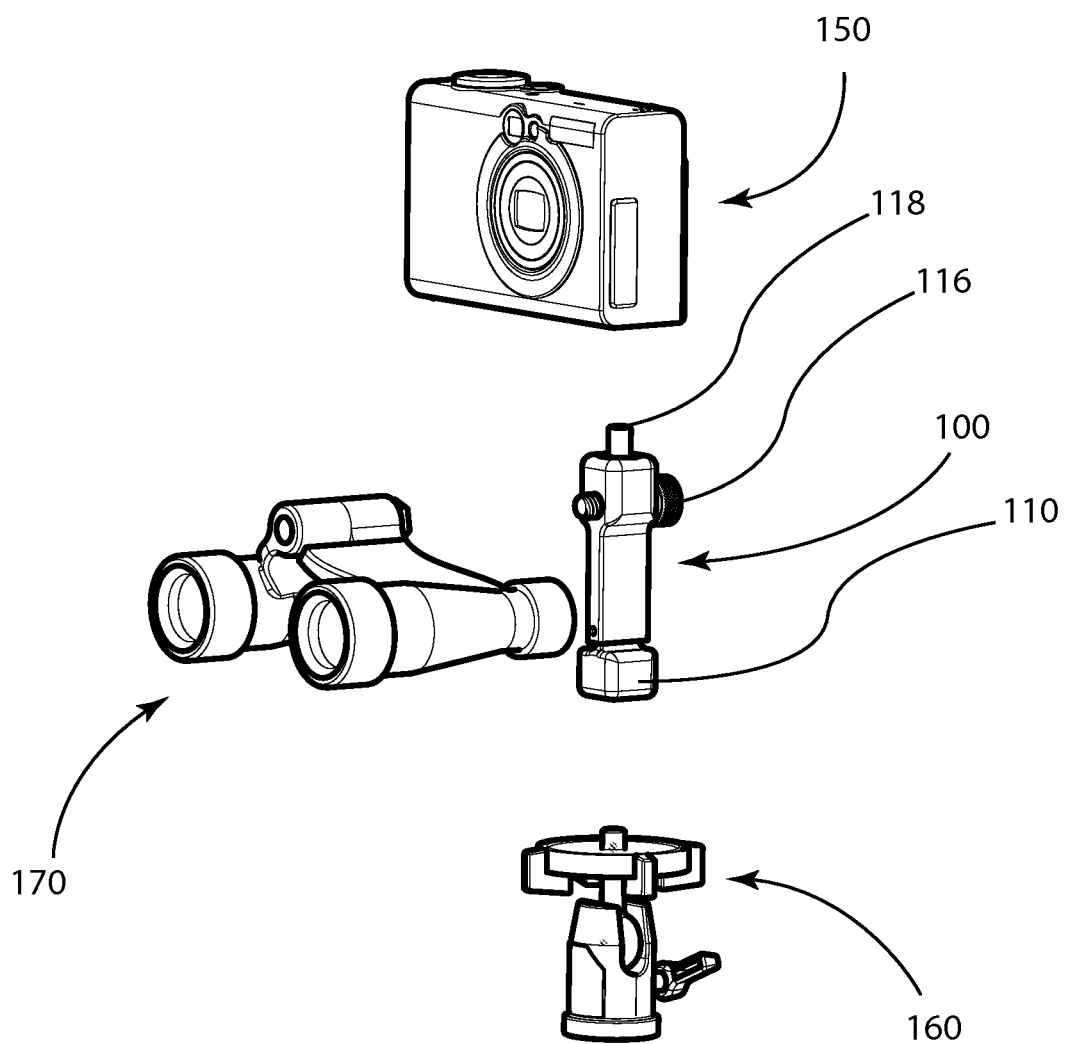
FIG. 3 is an exploded view of the assembly of FIG. 2.

FIG. 2 is an assembly including the example embodiment 100. FIG. 3 is an exploded view of the assembly of FIG. 2. A recording device mount 160 represents such camera mounts as are found in tripods, bases or other camera stabilization means. The camera mount 160 is engaged with the brace 100 by way of a threaded hole 119 (FIG. 5) that engages with standard mounting means found on common camera mounts such as camera mount 160, for example. The threaded knob 116 that is rotatably engaged with the brace 100 is engaged with a mating portion of a pair of binoculars 170. The threaded fitting 118 (FIG. 3) is engaged with the camera 150. Common cameras such as single lens reflex cameras or digital cameras like the one shown 150 often have a standard fitting at the base that is accommodated by the threaded fitting 118. Adaptable means are provided for cameras with varying standards.

Figure 4:
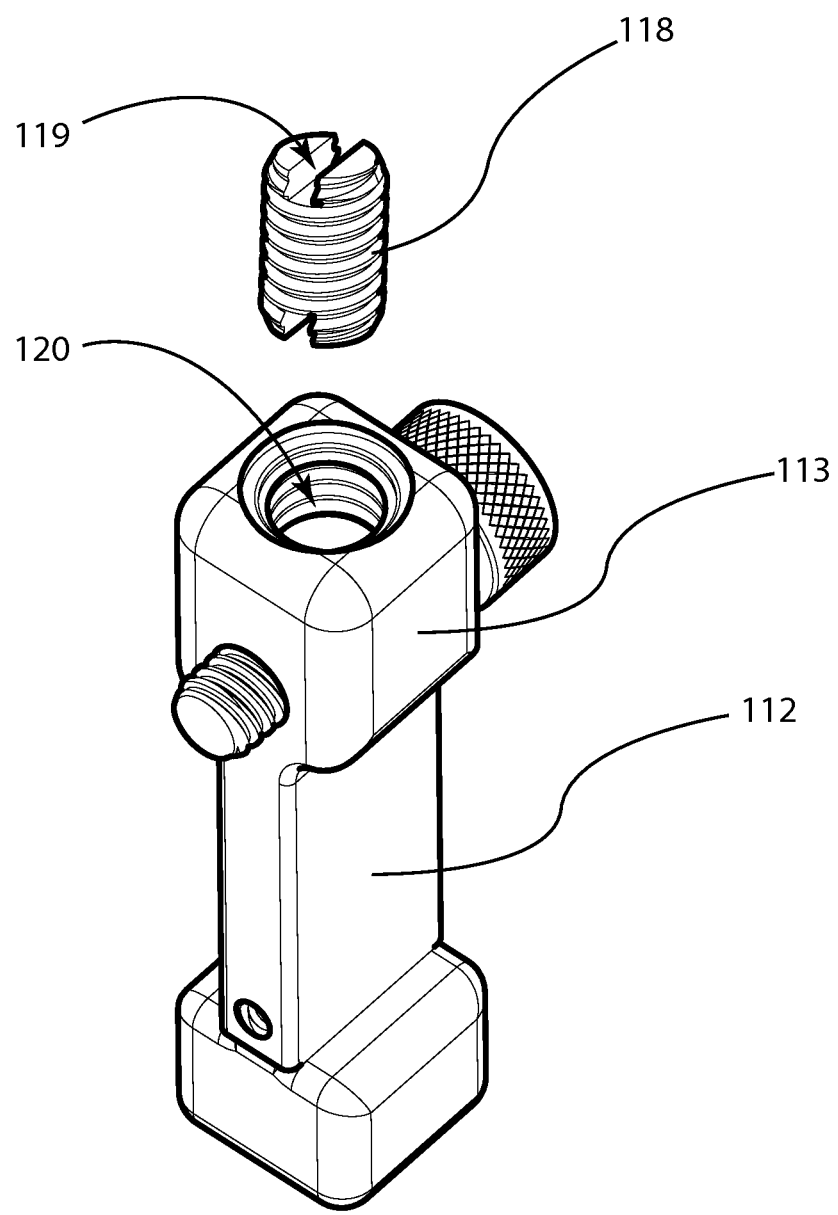
FIG. 4 is an exploded view of FIG. 1.

One skilled in the art will understand that a threaded receptacle may receive a transitional fitting that accommodates one fitting at one end and provides a fitting of a different standard at the opposing end. The threaded fitting 118 is further illustrated in FIG. 4. Like reference numbers refer to like components. The threaded fitting 118 comprises a slot 119 intended for a screw driver or other rotational assistance means. The threaded fitting 118 engages with a threaded receptacle 120 in the top 113 of the upper member 112.

Figure 5:
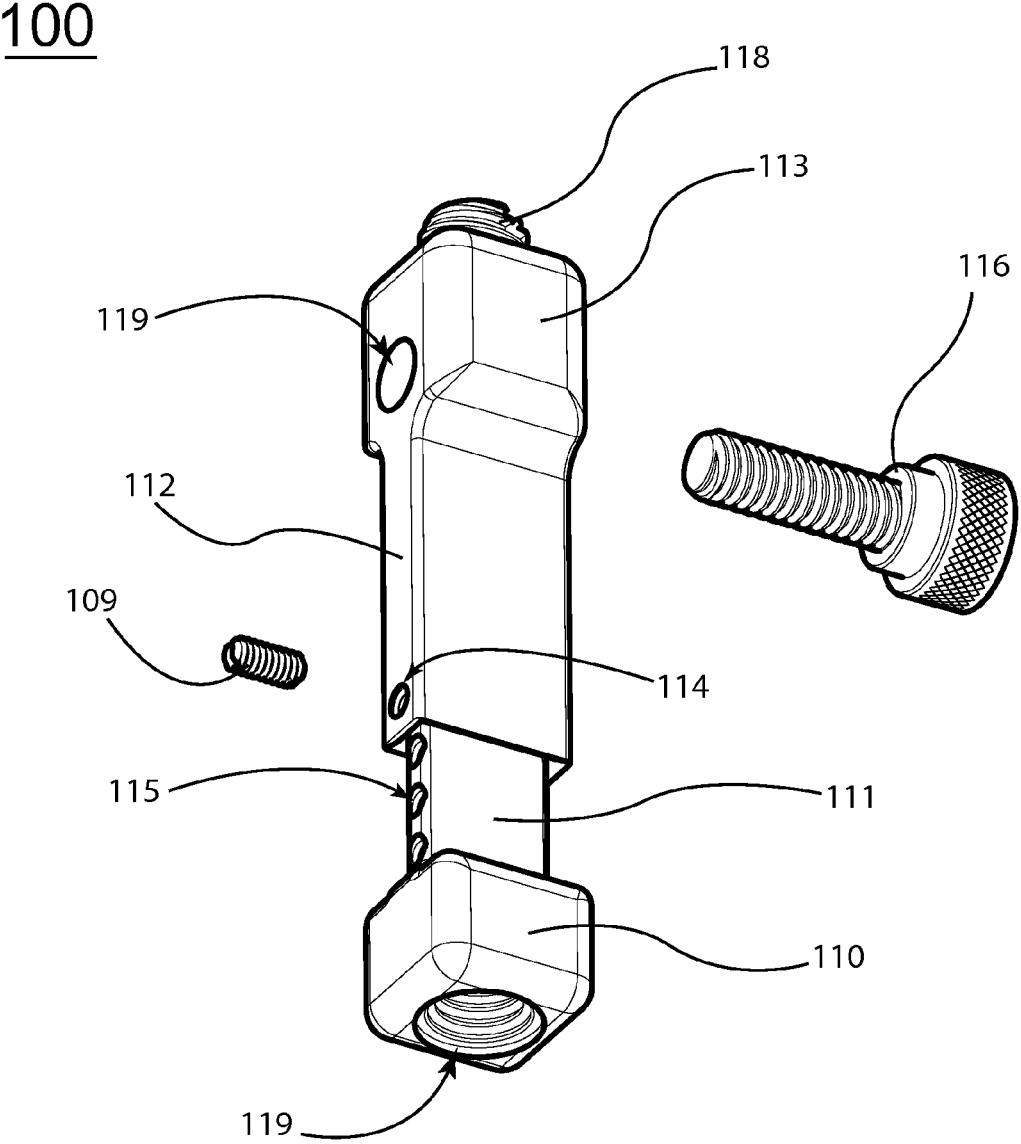
FIG. 5 is a perspective, exploded view of the present disclosure.
Figure 6:
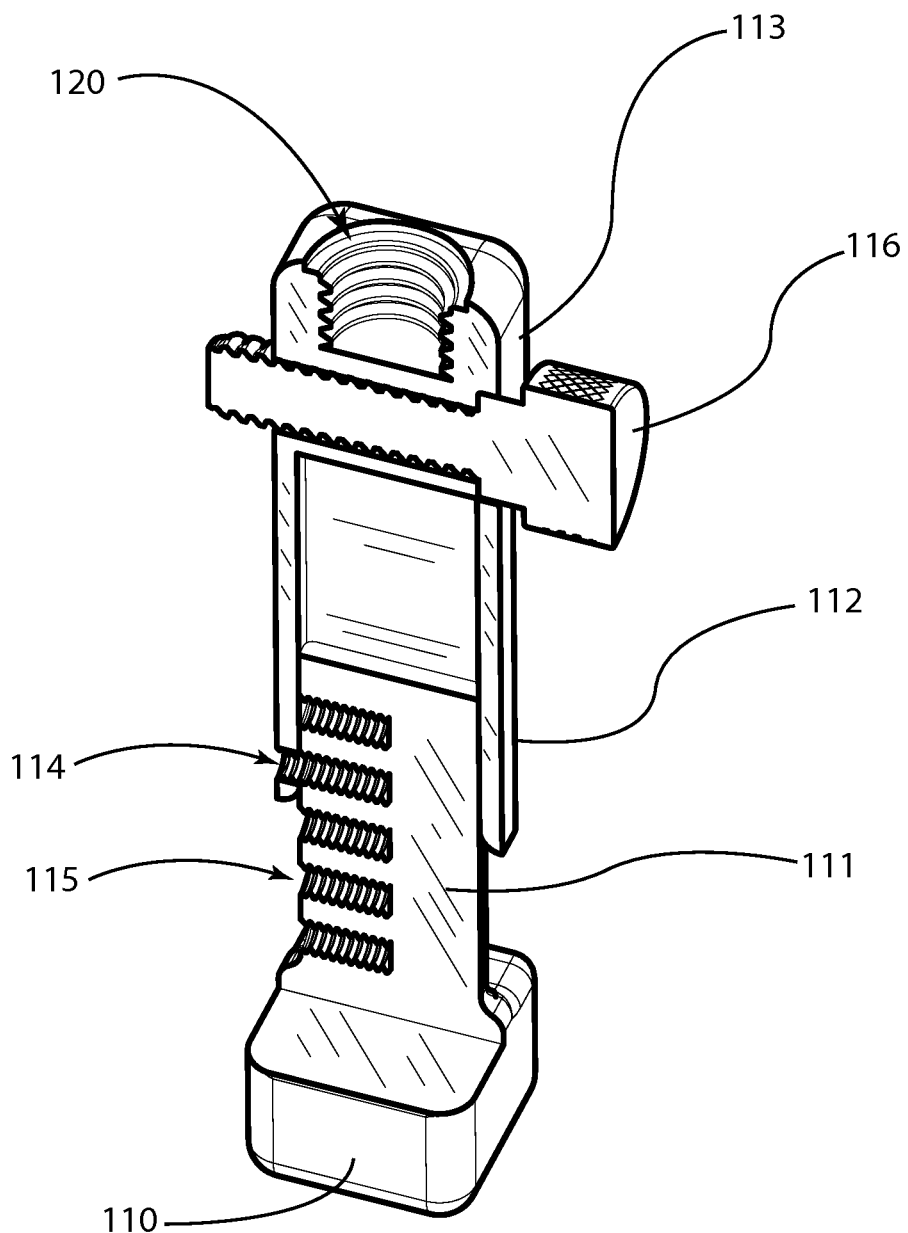
FIG. 6 is aside, perspective, section view of the embodiment.

Additional details and features are illustrated in FIG. 5 and FIG. 6. FIG. 5 is a perspective, exploded view; and FIG. 6 is a side, perspective, section view, of the embodiment 100. The height of the brace 100 is adjustable by way of lateral motion between the upper member and lower member and a means of interference at the desired height adjustment. The height is adjustable so as to accommodate binoculars of various configurations. A hole 119 in the top 113 of the upper member 112 houses the threaded knob 116. A threaded receptacle 119 in the base 110 of the lower member provides a means of engagement with the standard threaded post on a common camera mount 160 (FIG. 3). The lower member also comprises a linear portion 111 that is laterally engaged with the upper member 112. The linear portion 111 further comprises a series of threaded holes 115 that align with hole 114 when moved laterally inside upper member 112, to allow insertion of an interference means 109. One skilled in the art will understand that an interference means may be a threaded cylinder, or may be a longitudinal form with a snap-fit, a detent and protrusion, or other removable-fastening means.

Figure 7:
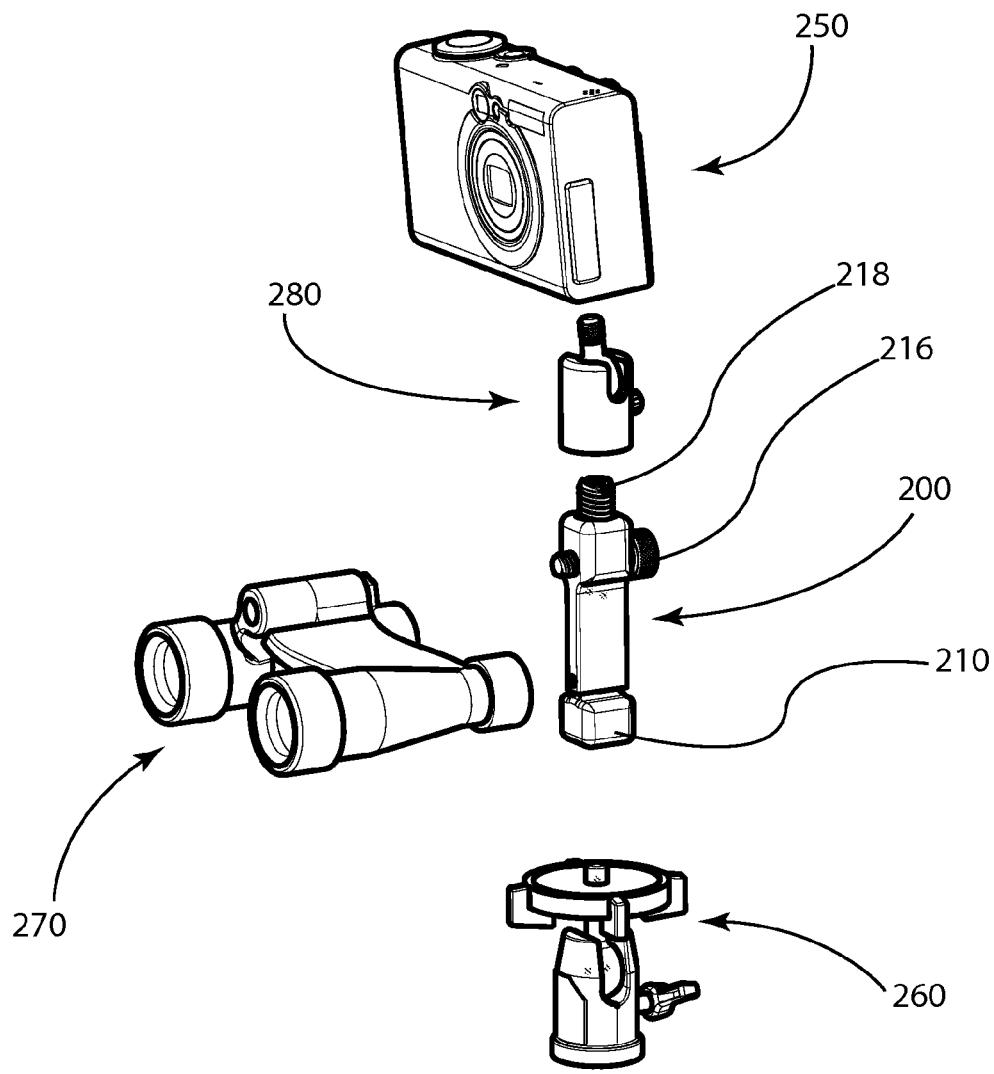
FIG. 7 is an exploded view of an iteration of the embodiment

FIG. 7 is an exploded view of an iteration of the embodiment. A recording device mount 260 represents such recording device mounts as are found in tripods, bases or other recording device stabilization means. The recording device mount 260 is engaged with the brace 200 that engages with standard mounting means found for example on common camera mounts such as camera mount 260. A threaded knob 216 that is rotatably engaged with the brace 200 is engaged with a mating portion of a pair of binoculars 270. The threaded fitting 218 is engaged with a ball joint pivot mounting device 280 that in turn engages with a camera 250. Common cameras such as single lens reflex cameras or digital cameras like the one shown 250 often have a standard fitting at the base that is accommodated by the threaded fitting 218. Adaptable means are provided for cameras with varying standards. Ball joint pivoting mounting devices such as that illustrated as component 280 are common. The application of the ball mounting device 280 provides a means of aligning the focal point of the camera 250 with the focal point of the binoculars 270.

Figure 8:
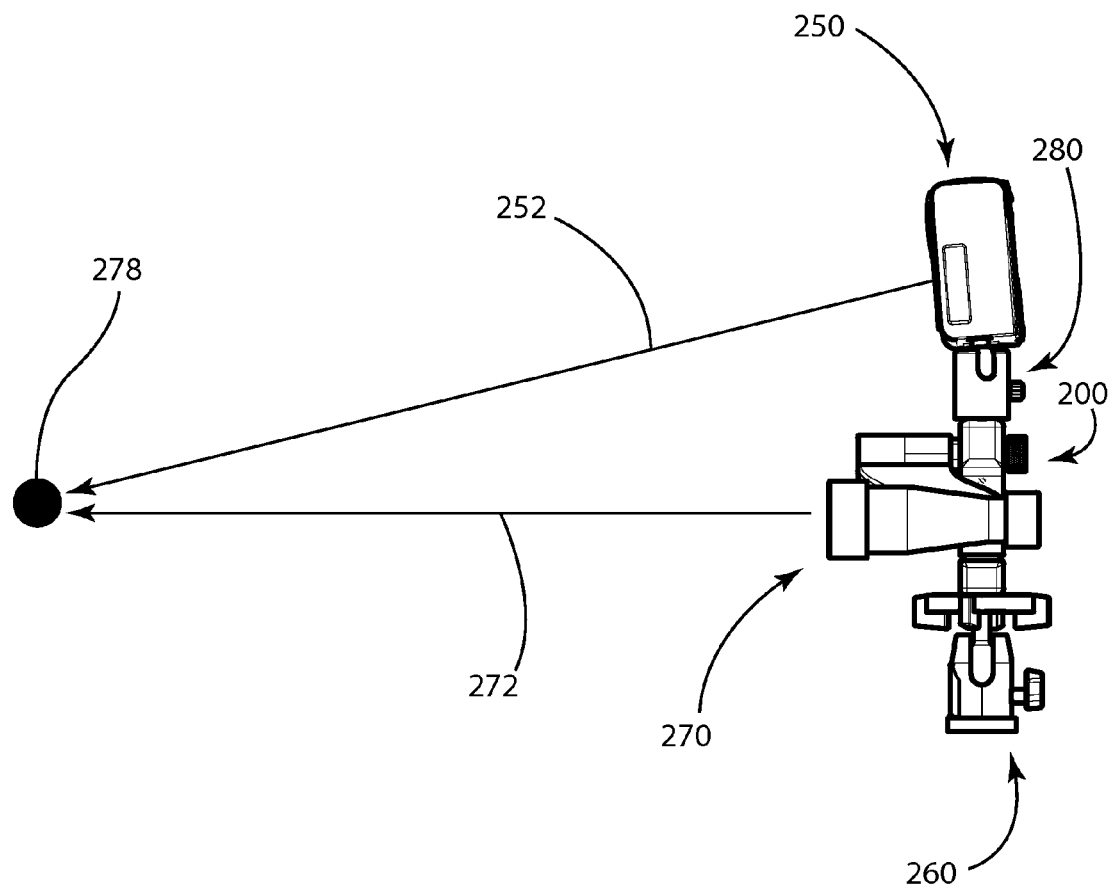
FIG. 8 depicts a method of focusing on a focal point using the present disclosure.

A method of focusing the for example a recording device such as a camera and a distance magnification device such as binoculars on a shared focal point allows the user to set a shared focal point and view through the binoculars while recording images with the camera or other visual recording device. FIG. 8 illustrates a common focal point shared between the camera 250 and the binoculars 270. The direction of the view of the camera lens is represented by line 252. The direction of view of the binoculars is represented by line 270. A common focal point 278 is shared between the camera 250 and the binoculars 270.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The invention claimed is:

1. A brace for engaging a recording device mount with a camera and a distance magnification device, comprising:
   a lower longitudinal member having a base portion with a first fitting for attachment to the recording device mount, and having a first linear portion extending above the base portion in the longitudinal direction, the first linear portion having a rectangular cross section with wide and narrow sides, the first linear portion having a plurality of threaded holes in one of the narrow sides of the first linear portion along the longitudinal direction;
   an upper longitudinal member slideably engaged with the lower longitudinal member, the upper longitudinal member having a top portion with a second fitting for attachment to the camera, and having a second linear portion extending below the top portion in the longitudinal direction, the second linear portion having a hollow rectangular cross section with wide and narrow sides that receives the first linear portion;
   an interference means engaged between the upper and lower longitudinal members providing locking adjustment in a longitudinal movement of said upper and lower longitudinal members, the interference means passing through a hole in one of the narrow sides of the second linear portion and engaging with one of the threaded holes in the first linear portion; and
   a means of engagement with the distance magnification device, the means of engagement being rotatably engaged with the upper longitudinal member and inserted through a hole in the top portion, the hole in the top portion being perpendicular to the longitudinal direction,
   wherein the first fitting and the second fitting are each threaded fittings that are parallel to the longitudinal direction with a common axis, and
   wherein the base portion has a rectangular cross section in which both dimensions are larger than the narrow side of the first linear portion, and the top portion has a rectangular cross section in which both dimensions are larger than the narrow side of the second linear portion.

* * * * *